United States Patent Office 3,082,189
Patented Mar. 19, 1963

3,082,189
HALOGEN RESINS STABILIZED WITH POLY-HYDRIC ALCOHOLS PHOSPHITES
Gerry P. Mack, Jackson Heights, and Emery Parker, New York, N.Y., assignors to Carlisle Chemical Works, Inc., Reading, Ohio, a corporation of Ohio
No Drawing. Original application Jan. 8, 1954, Ser. No. 403,054. Divided and this application July 3, 1959, Ser. No. 824,794
6 Claims. (Cl. 260—45.95)

This invention relates to halogen-containing stabilized resins, more specifically to stabilized resins containing vinyl chloride units.

As the invention is particularly useful in connection with vinyl chloride polymers and copolymers, it will be described in connection with such compositions. It is however, to be understood that the invention is not limited to such compositions but applies equally to other resin compositions containing halogen.

It is well known that vinyl chloride compositions, when exposed to elevated temperatures, tend to discolor and to decompose with liberation of hydrochloric acid, and that it is necessary to add stabilizers to prevent such decomposition. A great variety of stabilizers are being used successfully. One class of stabilizers consists of metal salts of medium and high molecular weight fatty acids, particularly salts of the earth alkali metals, such as calcium, strontium, barium, together with salts of heavy metals such as cadmium, zinc, lead, and tin. If a mixture of such salts is incorporated in the vinyl chloride resins, the thermal stability of such compositions is considerably improved; however, it is not yet sufficient for very severe heating cycles, particularly if recovered scrap is being used together with virgin vinyl chloride resin. To increase the stabilizing effect of the recited metal salt stabilizers, it has been proposed to add thereto compounds which act as auxiliary stabilizers. Such auxiliary stabilizers are, for instance, trialkyl and triaryl phosphites, also esters of phosphorous acid, the acid phosphites and others.

While such esters containing trivalent phosphorous perform under certain circumstances satisfactorily, there are very great disadvantages connected with their use. The esters containing low molecular weight alkyl or alkenyl groups containing 1 to 8 carbon atoms have a very high vapor pressure and are therefore too volatile at the high temperatures of 400° F. and more, to which the vinyl resins are frequently exposed during processing. The esters containing aromatic groups only, such as phenyl or cresyl (the triaryl phosphites), tend to decompose during these high temperatures with the liberation of free phenol or cresol, which compounds are highly objectionable because of their offensive smell and their toxic properties. Special precautions must be taken to protect the workman around the processing equipment. The finished articles carry the objectionable odor of the phenols for a very prolonged time. Such compositions are also unsuitable for vinyl films or tubing or other articles used in connection with food products, such as packaging film, tubing for beverages and the like.

It is an object of this invention to provide stabilized resin compositions of the type described which contain as auxiliary stabilizers novel types of phosphites, which are stable up to very high temperatures and non-toxic and which impart to the resins increased stability against decomposition on exposure to heat or light.

The new stabilizers according to the invention are mixed phosphites in which at least one valence of the trivalent phosphorus is bound through oxygen to a monovalent alkyl or aromatic group, and at least one of the other valences is bound through oxygen to the hydrocarbon residue of a dihydric or polyhydric alcohol.

These phosphites are of advantage not only because of their high boiling points and low vapor pressures but also because their stabilizing potency is considerably superior to the stabilizing effect of the conventional alkyl or aryl phosphites. Said hydrocarbon group may be derived from dihydric or polyhydric alcohols, such as ethylene glycol, propylene glycol, polyethylene and polypropylene glycols, glycerol, trimethylol propane and trimethylol ethane, erythritol and other sugar alcohols, and the like.

All these esters containing trivalent phosphorus can be conveniently prepared through an alcohol interchange reaction by reacting trialkyl or triaryl phosphites with a dihydric or polyhydric alcohol. When dihydric alcohols are used for the reaction, they must be employed in amounts which are insufficient to replace all the alkyl or aryl groups of the phosphite. The reaction temperatures must be sufficient to remove the liberated alcohol or phenol. Depending on the ratio of the reactants and the reaction conditions, one obtains mixed phosphites containing the above enumerated groups in various ratios best suited for the particular purpose. Some of the compounds can be prepared also through the classical reaction by reacting phosphorous trichloride in the presence of a base with the corresponding alcohols.

The mixed esters obtained by the alcoholysis of phosphorous esters with dihydric or polyhydric alcohols are in most cases rather complex compounds. In the simplest case, i.e. in the reaction of equimolar amounts of a triester and a glycol, monomeric compounds can be obtained which correspond to the formula

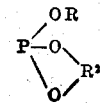

wherein $R^2$ is a divalent alkane radical having the free valences on two different carbon atoms. However, cyclic compounds of this type will be formed only when the reacting compounds have a steric configuration which is suitable for ring formation. In most cases, particularly with higher glycols and triols, polymeric compounds of various composition will be formed. In the case of higher glycols, the obtained phosphites will generally correspond to a formula of the type:

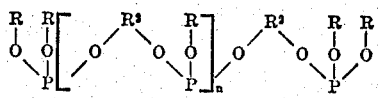

and in the case of triols to a formula of the type:

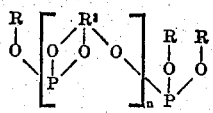

wherein $R^2$ and $R^3$ are the hydrocarbon residues of the diol or triol, respectively, and $n$ designates the polymerization degree.

These polymeric mixed phosphites are mostly very viscous liquids and decompose when subjected to vacuum distillation; they are particularly good stabilizers because they combine excellent heat stability with an increased content of the effective organically bound radical of the phosphorous acid.

The phosphites of the invention can be used in a wide range of proportions, for example from 0.1 to 10%, preferably 0.5 to 2% by weight of the halogen-containing resin. They may be used alone, or preferably in synergistic combination with other stabilizers such as organo-tin compounds and/or salts of bivalent or tetravalent metals. Examples are salts of the earth alkali metals, magnesium, cadmium, zinc and tin with fatty acids containing from 6 to 18 carbon atoms, for instance hexoic acids, 2-ethylhexoic acid, capric acid, caprylic acid, caproic acid, lauric acid, myristic acid, oleic acid, stearic aid, ricinoleic acid and others. Also mixtures of these salts, or double salts, for instance barium-cadmium or calcium-zinc salts, may be used. In general, about 1 to 5 percent of these salts or mixtures of salts based on the dry weight of the resin are sufficient to obtain good stabilizing effects in combination with the recited phosphites. The new phosphite stabilizers are also useful in combination with any kind of the widely used lead stabilizers, where they greatly reduce the opacity normally present in such lead stabilized resin articles on vinyl chloride basis. Such lead stabilizers are inorganic or organic lead salts, e.g. the basic carbonate, salicylate, maleate, 2-ethyl hexoate, phosphite, basic silicate, basic phthalate, basic maleate, the stearate, ricinoleate, and the like.

Our novel auxiliary stabilizers may be used for all types of halogen-containing resins for which the recited primary metal salt stabilizers are normally employed and they increase the heat and light stability of such resins while reducing the cloudiness sometimes imparted by said metal salts. An illustrative list of such resins is, for instance, given in our Patent No. 2,592,926.

The following example will serve to illustrate the invention. It is to be understood that this example is not to be considered as limiting the scope of the invention, which is defined by the appended claims. Specific primary and auxiliary stabilizers given in the example may be replaced by other compounds belonging to the groups recited above, and a stabilizer used for a particular resin may be used with similar effect for other halogen-containing resins. All parts are given by weight, unless specified otherwise.

*Example*

A plastisol was prepared by mixing 300 parts of a dispersion-type vinyl chloride resin with 189 parts of dioctyl phthalate. After a homogeneous mix was obtained, 9 parts of barium ricinoleate and 3 parts of cadmium 2-ethyl hexoate were added and mixed in thoroughly. The mix was then divided into three portions of 167 g. each. To the first 167 grams of this plastisol there were added .5 gram of a phenyl glyceryl phosphite prepared by an alcohol interchange between two moles of triphenyl phosphite and 1 mole of glycerol at elevated temperatures up to 200° C. under vacuum until the glycerol had substantially reacted and the corresponding amount of phenol was eliminated. At 20° C., the refractive index of the phosphite was 1.5589, its specific gravity 1.2740.

To the second portion, there were added .5 gram of a phosphite prepared similarly by the alcohol interchange of 2 moles of triethyl phosphite with 1 mole of glycerol.

To the third portion there were added .5 gram of a phenyl glyceryl phosphite prepared as above but employing a ratio of 1 mole of triphenyl phosphite to .9 mole of glycerol. This phosphite was extremely viscous and did not flow at room temperature. Its specific gravity at 20° C. was 1.4000, the refractive index at 55° C. 1.5398.

The three glyceryl phosphites obtained as described above corresponded essentially to the formula on lines 50 to 54 in column 2 where R was phenyl or ethyl, respectively, and differed from each other by the value of $n$, which may be an integer or a fractional number, and also by the number of residual R groups. These differences are primarily due to the different ratios of reactants employed to bring about the reaction.

From the three thus stabilized plastisols, films of equal thickness were cast and fused at 370° F. for 5 to 45 minutes. Slight discoloration was noticed in all three films only after 45 minutes heating. All three films were clear and odorless, whereas similar films containing triphenyl phosphite fumed strongly, developed objectionable phenol odor during the baking period and were discolored already after 30 minutes heating under identical conditions.

As noted hereinbefore, the phosphite stabilizers cannot only be used alone or in combination with organic metal salt stabilizers and/or epoxy compounds but also in combination with monomeric or polymeric organotin stabilizers where they enhance the stabilizing effect of the organotin compounds. A large number of suitable organotin stabilizers has been described in the literature and patent art. Such organotin compounds are generally derivatives of tetravalent tin corresponding in the monomeric form to the general formula

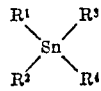

wherein $R^1$, $R^2$, $R^3$, $R^4$ represent a wide variety of monovalent organic radicals such as alkyl, aryl, aralkyl, cyclic, also the residues of carboxylic acids, esters, alcohols, mercaptanes, an active methylene group containing compounds, sulfonamides, and the like. At least one but not more than three of said groups must be bound to the central tin atom through carbon-tin bonds.

This application is a division of our application Ser. No. 403,054, filed Jan. 8, 1954 for "Halogen-Containing Resins Stabilized With a Metal Salt and Organic Phosphite," now abandoned.

We claim:
1. A heat resistant resin composition comprising as a major constituent a resinous vinyl chloride polymer and as a stabilizing agent an alcohol interchange reaction product of a phosphorous acid ester of the formula

$$P(OR)_3$$

wherein R is a member of the group consisting of alkyl and aryl and the compound ROH is volatile under the alcohol interchange conditions, with a polyhydric alcohol having two to four hydroxy groups, at a temperature sufficient to remove the liberated ROH compound, the proportions of the reactants being such that the product is a mixed phosphite in which at least one valence of the trivalent phosphorus is bound to a monovalent OR group and at least one of the other valences is bound through oxygen to the hydrocarbon residue of said polyhydric alcohol.

2. The resin composition of claim 1 containing as additional stabilizer a salt of a metal of the group consisting of earth alkali metals, magnesium, cadmium, zinc, and tin with a fatty acid containing from 6 to 18 carbon atoms.

3. The resin composition of claim 1 containing as additional stabilizer a lead salt of the group consisting of basic carbonate, salicylate, maleate, 2-ethylhexoate, phosphite, basic silicate, basic phthalate, basic maleate, stearate, and ricinoleate.

4. A heat resistant resin composition comprising as a major constituent a resinous vinyl chloride polymer and as a stabilizing agent an alcohol interchange reaction product obtained by heating 1.1 to 2 moles of a phosphorous acid ester of the formula $$P(OR)_3$$

wherein OR is a member of the group consisting of radicals of lower aliphatic alcohols and phenols, with about 1 mole of glycerol at a temperature and for a period of time sufficient to distill off at least one mole of ROH formed in the reaction.

5. A heat resistant resin composition comprising as a major constituent a resinous vinyl chloride polymer and as a stabilizing agent an alcohol interchange reaction product obtained by heating 1 mole of a phosphorous ester of the formula $$P(OR)_3$$

wherein OR is a member of the group consisting of radicals of lower aliphatic alcohols and phenols, with about 1 to 2 moles of a diol, at a temperature and for a period of time sufficient to distill off at least one mole of ROH formed in the reaction.

6. A heat resistant resin composition comprising as a major constituent a halogen-containing vinyl resin and as a stabilizing agent phenyl glyceryl phosphite.

References Cited in the file of this patent

UNITED STATES PATENTS

| | | |
|---|---|---|
| 2,728,789 | Morris et al. | Dec. 27, 1955 |
| 2,752,319 | Lipke et al. | June 26, 1956 |
| 2,834,798 | Hechenbleikner et al. | May 13, 1958 |
| 2,841,606 | Hechenbleikner et al. | July 1, 1958 |
| 2,841,608 | Hechenbleikner et al. | July 1, 1958 |
| 2,847,443 | Hechenbleikner et al. | Aug. 22, 1958 |
| 2,856,369 | Smith | Oct. 14, 1958 |
| 2,867,594 | Haensel et al. | Jan. 6, 1959 |